Patented June 14, 1932

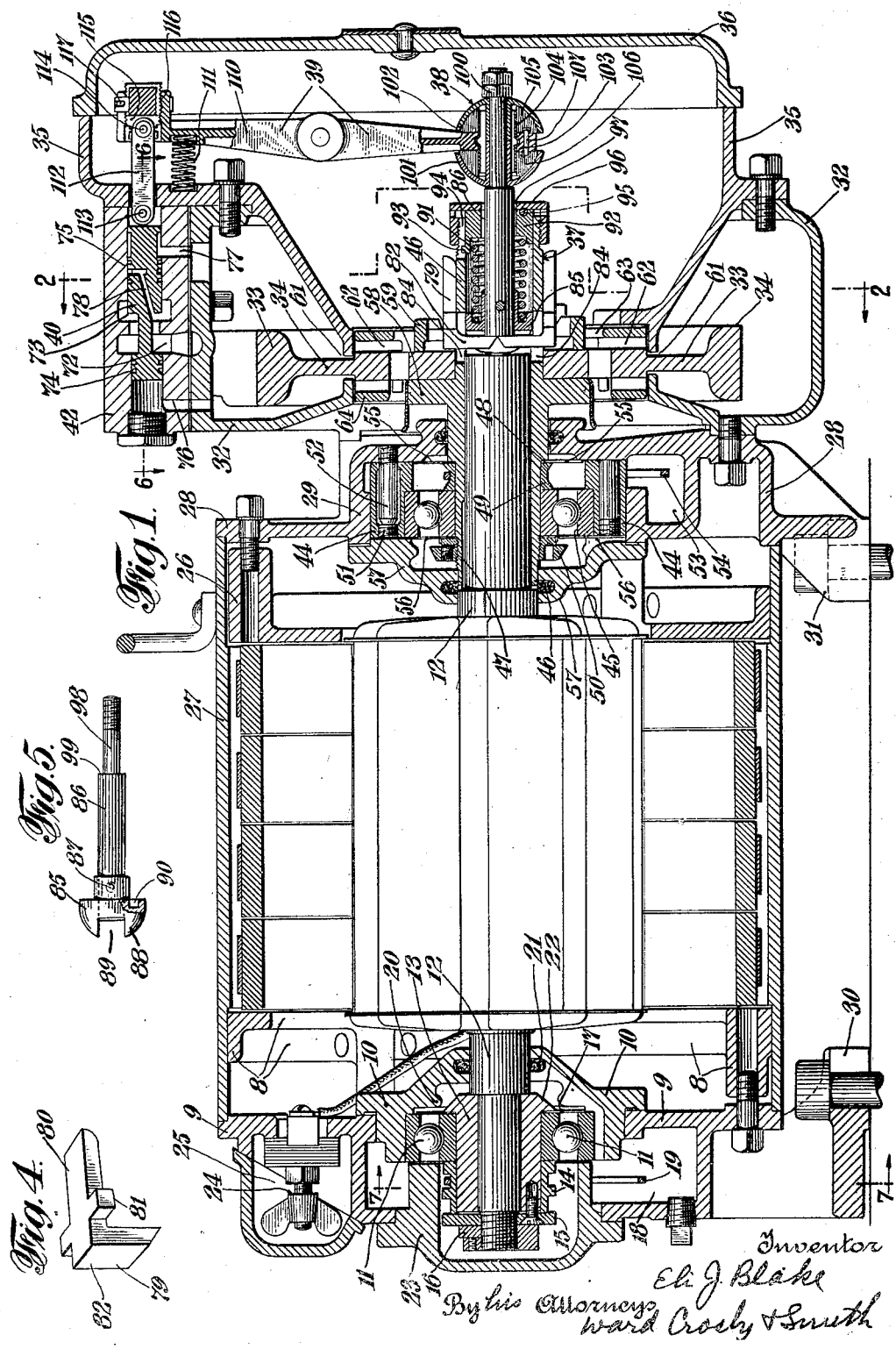

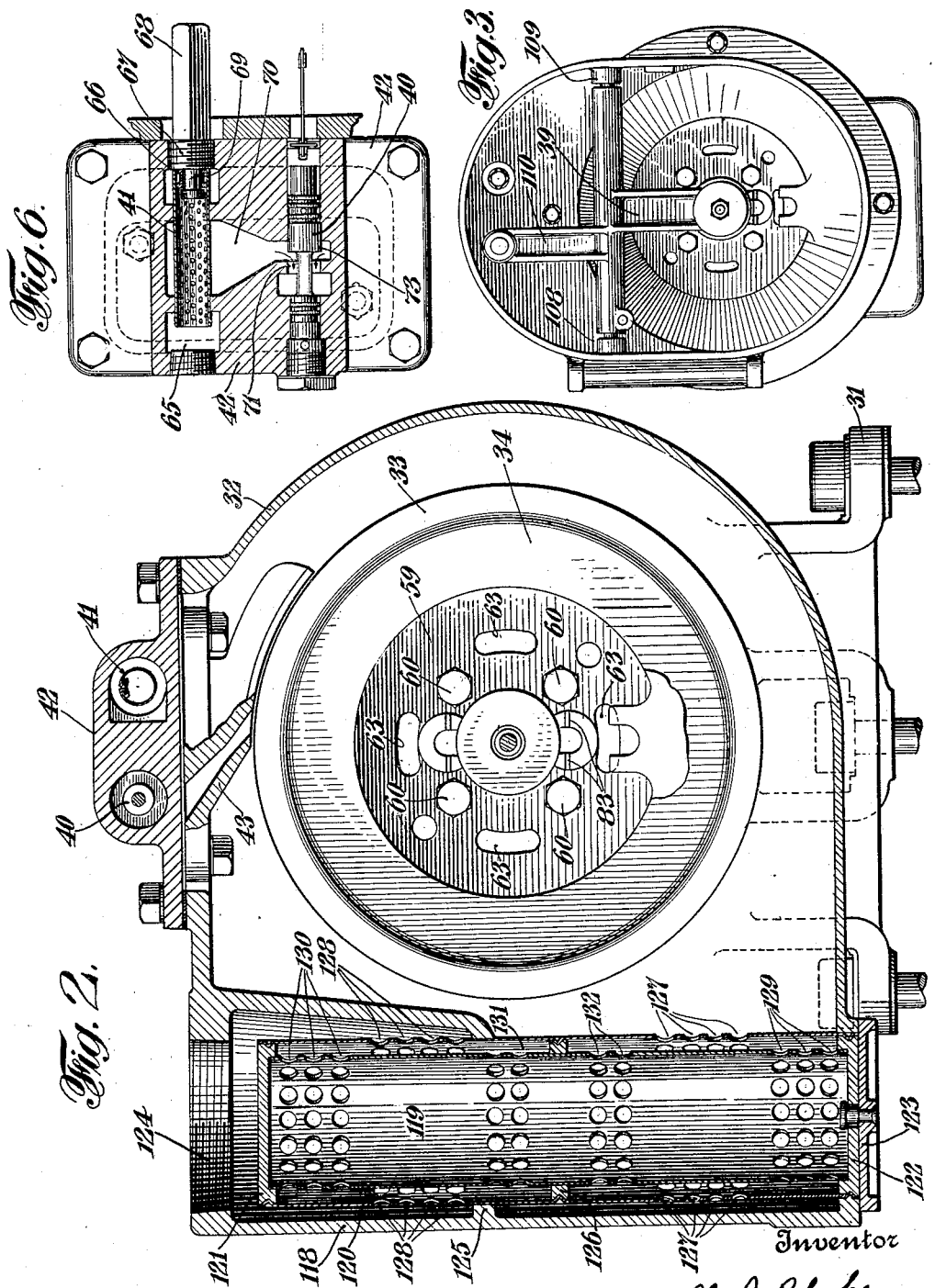

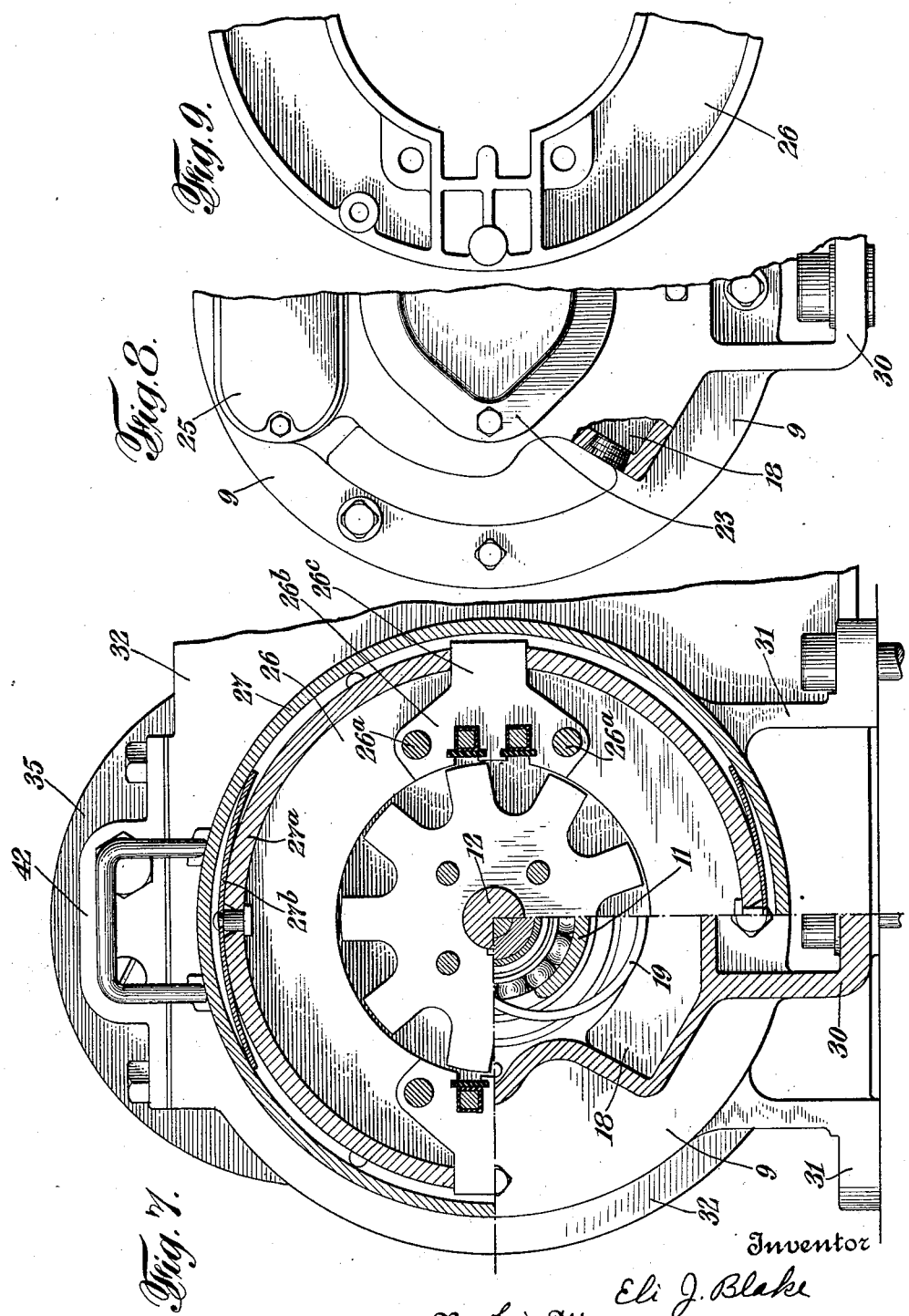

1,862,919

UNITED STATES PATENT OFFICE

ELI J. BLAKE, OF BUFFALO, NEW YORK, ASSIGNOR, BY MESNE ASSIGNMENTS, TO SIMPLEX EQUIPMENT COMPANY, INC., OF NEW YORK, N. Y., A CORPORATION OF DELAWARE

TURBINE GENERATOR SET

Application filed July 14, 1925. Serial No. 43,540.

My invention relates to improvements in turbine generator sets and more especially to turbine generator sets similar to the disclosure of my Patent 1,645,411, copending herewith, and adapted to be placed on locomotives to be supplied with steam therefrom and to furnish electric current for the locomotive cab lights, headlights, etc.

The main object of the invention is to provide a turbine generator set which is more simple and efficient in operation and construction and which is easily assembled and disassembled for repair and replacement and which is nevertheless very compact. Further and more specific objects and advantages will more clearly appear from the description below taken in connection with the accompanying drawings.

In the drawings Fig. 1 is a vertical section through a turbine generator set embodying my improvements in a preferred form thereof, Fig. 2 is a section taken substantially along the line 2—2 of Fig. 1, Fig. 3 is an end view with the cover removed showing the assembled governor parts inside the turbine end of the apparatus, Figs. 4 and 5 are perspective views of some of the centrifugal governor parts, Fig. 6 is a section taken on the line 6—6 of Fig. 1, Fig. 7 is a three-quarter section through the central portion of the generator and a quarter section substantially along the line 7—7 of Fig. 1, Fig. 8 is an exterior view, partly broken away, of the generator end of the set, and Fig. 9 is a detail view of a portion of one of the generator clamping plates.

Referring to the drawings, 8 represents an end frame or clamping plate of a suitable form of alternating current generator. The generator is provided with an end plate 9 bolted to the framework 8 (see Fig. 8). The plate 9 is centrally recessed to accommodate a supporting housing 10 for a ball bearing and raceway assembly 11 for one end of the horizontal generator shaft 12. A sleeve 13 is placed on a reduced portion of the shaft, which sleeve abuts against a shoulder on the shaft and is firmly held thereagainst by an oil ring collar 14, a washer plate 15 and a lock nut 16 on the end of the shaft 12.

The sleeve 13 is provided with an enlarged head against which is placed a washer like disc 17 which overlaps the space between the raceways of the ball bearing assembly 11 and serves to retain the oil between the raceways. In the plate 9 a suitable oil well 18 is provided into which an oil ring 19 dips for carrying oil to the bearing. The supporting housing 10 may be provided with a suitable annular flange 20 and annular recess 21, respectively, for deflecting the oil toward the bearing and for preventing the oil from creeping along the shaft toward the generator armature. The sleeve 13 may also be provided with a conical face as at 22 for deflecting the oil toward the bearing. A cap plate 23 may be suitably bolted to the outside of the plate 9 to completely enclose the bearing and associated parts.

The above described bearing forms one of the two main bearings of the generator and also serves to fix the shaft 12 against longitudinal movement within the generator frame.

Electrical terminals to the generator may be provided as at 24 within a chamber 25 formed upon the plate 9.

At the end of the generator opposite from the plate or frame 8 a clamping plate 26 (see Fig. 9) may be provided and retained in position by any suitable means which may include rods 26a extending to the clamping plate 8 (see Fig. 7). Laminated pole pieces 26b may be mounted upon these rods and clamped in position between the plates 8 and 26. A tubular brass casing member 27 surrounds the generator parts, which casing with the end members of the housing forms a substantially air-tight enclosure for the generator which prevents the fan action of the motor from setting up currents of air inwardly along the shaft and outwardly at the periphery of the armature, such currents being objectionable in some instances since they tend to cause oil to be drawn into the enclosure from the bearings.

Cooperating pairs of semi-cylindrical permanent magnets 27a are disposed within the housing 27 to form a substantially cylindrical structure also held between said clamping frames or plates 8 and 26. The laminated pole pieces are preferably formed with extensions 26c engaged between the ends of cooperating magnets, and suitable spring means as at 27b act between the housing 27 and said magnets centrally thereof to force the magnet ends firmly against the pole extensions. This arrangement is not only durable and convenient to assemble but also insures a magnetically satisfactory contact between the magnets and the pole pieces.

Bolted to the clamping ring 26 is an intermediate housing or end plate member 28 provided with a bearing housing 29 for receiving one of the main generator bearings as hereinafter described. The end plates 9 and 28 respectively may be provided with slotted feet as at 30 and 31 by means of which the same may be bolted to a suitable base such as the top of a locomotive.

Bolted to the end plate 28 is a turbine wheel chamber 32 within which the periphery 33 of a turbine wheel 34 rotates.

Attached to the turbine wheel chamber is a governor housing 35 provided with a suitable cover 36. Within the governor housing the centrifugal governor 37 is mounted to be actuated by the shaft 12 and is connected through a universal bearing at 38 to a governor lever 39 which lever in turn is operatively connected to a governor valve member 40.

The valve member 40 together with a strainer 41, for straining the steam before being admitted to the apparatus, are both arranged within a single integral block 42 bolted to the turbine wheel chamber (see Fig. 2). On the under side of the block 42, a nozzle member 43 may be bolted. The valve and strainer block or body member with the nozzle attached are separable as an assembled unit from the turbine wheel chamber.

The generator bearing within the housing 29 on the end plate 28 will now be more fully described in detail. A cylindrical keeper ring or bearing sleeve 44 is snugly fitted into the housing 29, and a ball bearing and raceway assembly 45 is in turn received in the keeper ring 44. In order to provide a means for mounting the turbine wheel 34 and its associated parts within a sub-assembly separable from the generator, the turbine wheel is fixed upon a tubular shaft or sleeve 46, upon which the ball bearing assembly 45 is received. The sleeve 46 also extends into the governor housing and encloses certain of the governor parts as hereinafter described, and is keyed to the generator shaft 12 as indicated at 47. The generator shaft and the sleeve are, however, free for relative longitudinal movement and adjustment. The sleeve 46 may be provided with a shoulder as at 48, an oil ring collar 49 being received between said shoulder and the ball bearing assembly. The tubular shaft or sleeve is held against longitudinal movement within the ball bearing assembly by reason of the shoulder 48 and the collar 49 on the one side of the bearing and a lock nut 50 on its other side.

In order that the ball bearing assembly may be readily removed from the sleeve 46, the keeper ring 44 may be provided with tapped holes as at 51. The bearing housing may be provided with a stud as at 52 protruding into the tapped hole 51. In order to remove the keeper ring and its bearing assembly, a suitable bolt or stud may be screwed into the tapped hole 51 into engagement with the stud 52. Pressure is thereby exerted to force apart the keeper ring with its enclosed bearing asembly from the bearing housing and sleeve 46.

The bearing housing may be provided with an oil well 53 into which dips an oil ring 54 suspended from the oil ring collar 49 and serving to carry oil up into the bearing. Suitable baffle plates or washer like members 55 and 56 may be provided at either side of the bearing assembly in order to check the flow of oil away from the bearing. A cap plate 57 fixed to the housing 29 serves to completely enclose this bearing.

Inasmuch as the turbine wheel is fixed to the hollow shaft or sleeve 46 and this sleeve is fixed against longitudinal movement in the bearing assembly 45, the turbine wheel is also thus fixed against longitudinal movement in respect to the frame and housing members and independently of the generator shaft 12. Furthermore, it will be noted that the intermediate housing or end plate 28 may be detached from the generator clamping ring 26, and after so doing the turbine wheel and associated housings and parts together with the bearing as just described will be separable from the generator as an assembled unit. This fact permits either the generator or turbine wheel portions to be readily inspected or repaired separately without disturbing the adjustment or assembly of the whole apparatus.

The turbine wheel chamber and enclosed parts will now be more fully described in detail. The sleeve 46 may be provided with a flange 58 against which the wheel 34 may be bolted. On the side of the wheel opposite from flange 58 a fulcrum plate 59 may be bolted as by bolts 60 (see Fig. 2). The fulcrum plate engages certain of the governor parts as hereinafter described and is also provided at its periphery with a fan portion for a purpose about to be described.

It will be noted that the turbine wheel chamber 32 is annular in form and that its inner wall is provided with an annular slot 61 of a width just sufficient to permit the turbine wheel 34 to extend and rotate there-through. In order to prevent the escape of exhaust steam from the turbine wheel chamber through the clearance space between the wheel and the edges of the slot 61, the fan portion upon the rotating fulcrum plate 59 is provided for creating a pressure at this slot inwardly of the turbine wheel chamber for opposing the outward flow of steam. In the form illustrated a plurality of radial slots as at 62 are provided between the periphery of the fulcrum plate and the turbine wheel. Air may be admitted through openings as at 63. As the wheel rotates currents of air are drawn into the openings, 63, the air being forced through the radial slots toward the slot 61. The face of the wheel opposite from the fulcrum plate may also be provided with an annular fan member 64 similar in construction to the fan portions of the fulcrum plate 59. The peripheral edge of the fulcrum plate and of the fan plate 64 are arranged as indicated with a very small clearance space in respect to the inner walls of the turbine wheel chamber. The small clearance at these points and at the slot 61, together with the air pressure as created by the fans, is sufficient to substantially eliminate the escape of exhaust steam through the slot 61.

The strainer and valve members within the block 42 will now be described further in detail. As indicated in Fig. 6, steam may be admitted into an opening 65 and from there into the strainer member 41. The strainer may comprise a cylindrical perforated sheet metal member having an annular end piece 66 fixed therein. A plug member 67 provided with a suitable extension 68 for engagement with a wrench is threaded into the wall of the block 42 adjacent the end of the strainer. A screw 69 fixed within the plug 67 loosely fits and extends through the annular end piece 66. The strainer member is received within a suitable chamber in the block 42 as indicated, and may be readily removed therefrom for cleaning or replacement by merely screwing out the plug 67 which, through the connecting means comprising the screw 69 and the end piece 66, will permit the strainer to be drawn out.

Steam entering the strainer passes through the perforations thereof into a valve chamber 70, past a valve inlet opening 71, into the passageway 72, (see Fig. 1). The passage 72 admits the steam to the nozzle 43, (see Fig. 2), by which the steam is applied to suitable buckets on the periphery of the turbine wheel. A short and efficient steam path is thus provided.

The valve member 40 comprises a longitudinally slidable member of cylindrical form with a shoulder at 73, past which the steam escapes into the passage 72. The valve may be provided with suitable annular grooves as at 74 and 75 respectively at either end thereof for preventing the steam from leaking past the valve member. Any steam which leaks past the grooves 74 may be conducted to the turbine wheel chamber through a passage 76 and any steam leaking past the grooves 75 may also be conducted to the turbine wheel chamber through a passage 77. A passage 78 may also be provided from one of the grooves 75 and extends along the valve member to a point beyond the valve orifice and thus permits steam leaking into such groove to be conducted away and discharged into the passage 72. The grooves to the left of the opening to passage 78 are subjected to the live steam pressure which may be in the neighborhood of 250 pounds, whereas the grooves to the right of such opening are merely subjected to the regulated steam pressure of about 60 pounds as supplied to the nozzle. This arrangement amply insures against any appreciable leakage of steam around the valve member to the outside atmosphere.

The longitudinal position of the valve 40 is adjusted and controlled by the governor 37 which will now be described. A pair of centrifugal governor weights 79, one of which is shown in Fig. 4, comprise weight portions 80, projecting ears as at 81 and head portions 82. The projecting ears together with portions as at 83 on the fulcrum plate 59 (see Fig. 2) form knife-edge bearings for the weights. The head portions 82 extend through suitable apertures as at 84 through the walls of the sleeve 46 and into engagement with the end face of a thrust stem 86, (see Figs. 1 and 5), which extends longitudinally of the sleeve 46 and is attached to a thrust stem guide 85 by a pin 87. The thrust stem guide is formed with a head 88 having a spherical surface and slotted as at 89 to receive the heads of the weight members 82. Inside the thrust stem guide an annular groove 90 is formed for receiving one end of a coil spring 91 which embraces the thrust stem 86. The opposite end of the spring is received in a spring seat member 92, which in turn may be fitted within the end of the sleeve 46 and kept from rotating with respect thereto by reason of a lug 93 engaging a slot 94 at the end of the sleeve 46. The spring seat may be provided with suitable detents as at 95 engaging a governor cap 96 screwed upon the end of the sleeve 46 to retain it at the position to which it is set. Under the influence of the governor spring, these detents drop into recesses provided in the governor cap 96, and thus serve to lock the governor cap against rotation until moved with sufficient force to raise the walls out of the recesses. The tension of the spring 91 may be increased or decreased respectively by screwing the governor cap 96 in a direction on or off from the sleeve.

The spherically formed head 88 upon the thrust stem guide 85 engages the interior walls of the sleeve 46 and therefore permits the thrust stem to be free for limited universal movement in respect to the sleeve and generator shaft, suitable clearance being provided at 97 where the thrust stem passes through the spring seat member 92 and cap 96.

The outer end of the thrust stem may be formed with a reduced portion 98 with a shoulder at 99. Between this shoulder and suitable nuts at 100 a pair of hemispherical thrust cups 101 and 102 are retained. The governor arm 39 at its lower end is provided with an annular portion 103 within which a tubular member 104 is fixed. A pair of carbon or graphitized hemispheres 105 and 106 may be mounted upon the tubular member 104 and retained in their relative positions by a pin member 107. The hemispherical cups 101 and 102 rotate with the generator shaft and governor parts, while the carbon hemispheres 105 and 106 are fixed against rotation, the cups freely sliding thereover with very little friction. The hemispherical bearings and connecting members, as above described, permit longitudinal thrusts from the thrust pin 86 to be applied to the governor lever 39 without transmission of transverse strains from the generator shaft or the sleeve 46. The thrust stem is free to center itself because of the spherically formed seats at each end thereof as above described.

Referring to Fig. 3, the governor lever 39 may be pivotally mounted on bearings as at 108 and 109 and formed with an integral arm 110 operatively connected to the valve member in the manner shown in Fig. 1. A coiled compression spring 111 normally tends to hold the governor lever in a position whereby the valve 40 will be open and takes up any lost motion of connected parts. The arm 110 is attached to the valve member through a link 112 pivotally connected at 113 to the valve member and at 114 to a stud member 115 threaded to be received in a suitable threaded opening 116 within the end of the arm 110. The effective length of the link 112 may be adjusted by turning the stud 115 which may be locked in position by a suitable set screw or other means at 117.

The operation of the governor and governor valve is as follows: When steam is admitted to the apparatus in the condition as shown in the drawings, the turbine wheel will rotate until normal speed is acquired. When the speed exceeds normal, the centrifugal governor weights as at 79 will fly outwardly radially of the shaft, forcing the head portions 82 against the thrust pin 86 and in opposition to the normal pressure exerted by the spring 91. The thrust pin 86 will thereby be moved to the right as viewed in Fig. 1 with an accompanying movement of the governor lever 39. This will cause the upper end of the governor lever and attached valve to move to the left as viewed in Fig. 1, thus tending to close the valve. When the speed is sufficiently checked the parts will assume a balanced position by reason of the force exerted by springs 91 and 111, opposed by the centrifugal action of members 79. The speed at which the valve will be operated by the governor may be varied by adjusting the spring 91 in the manner above described.

Integral with the turbine wheel chamber 32 is a cylindrical muffler chamber 118, (see Fig. 2). This chamber may be vertically arranged and the lower part thereof is open to the turbine chamber in which the rim of the turbine wheel rotates so as to provide an inlet to the muffler for the exhaust steam from the turbine.

Axially arranged in the muffler chamber are two concentric perforated cylinders 119 and 120 closed at their ends by members 121 and 122. An opening is provided at the bottom of the muffler chamber, through which opening the cylinders 119 and 120 may be inserted. This opening is normally closed by a plate 123 to which the end piece 122 is secured for the purpose of withdrawing the perforated cylinders. To hold the parts in place the plate 123 is rigidly secured to the chamber in any suitable manner. The muffler chamber is provided with an exhaust steam outlet 124 at the top.

The chamber is provided with a centrally disposed internal circular wall 125, extending closely adjacent and fitting the outer cylinder 120. A centrally disposed transverse wall 126 is fixed between the cylinders 119 and 120 extending across the space between the same. The cylinder 120 is provided with a set of perforations 127 extending around the periphery of the cylinder centrally of the lower half of the cylinder. It is also provided with a set of perforations 128 extending around the periphery of the cylinder centrally of the upper half of the cylinder. The cylinder 119 is provided with a set of perforations 129 extending around the periphery thereof at the lower end of the cylinder, and a set of perforations 130 extending around the periphery thereof at the top of the cylinder and also a set of perforations extending around the periphery of the cylinder centrally thereof, part of which at 131 are above the wall 126 and part of which at 132 are below the wall 126.

The exhaust steam from the turbine first passes through the perforations 127 into the space between the lower portion of the cylinders. It then passes into the lower half of the cylinder 119, partly through the perforations 129 and partly through the perforations 132. The exhaust steam then passes upwardly in the cylinder 119 into the upper half thereof and then into the space between the cylinders partly through the perforations 131 and partly through the perforations 130. It then passes from this space through the perforations 128 into the space in the muffler chamber around the upper portion of the cylinder, from which it passes into the atmosphere through the exhaust opening 124. By this staggered arrangement of apertures in the cylinders part of the exhaust steam is caused to travel a greater distance than other parts in reaching the center of the cylinder 119 and also again in reaching the space around the top of the cylinders so that the puffs of steam are substantially neutralized and the sound ordinarily produced by such an exhaust is effectively muffled.

From the above it will be clear that I have provided an extremely compact, durable and efficient apparatus for the purposes described; one in which the bearings are readily accessible for inspection or replacement, also one in which the governor and its valve and the muffler are effectively and efficiently combined with the rest, and one in which the various governor, valve, strainer, nozzle, muffler and turbine housing parts are easily manufactured and assembled but yet may be readily separated for inspection or repair.

While I have described my improvements in great detail and with respect to a preferred form thereof, I do not desire to be limited to such details or form since many changes and modifications may be made and the improvements embodied in widely different forms without departing from the spirit and scope of the improvements in their broader aspects. I therefore desire to cover all forms coming within the language or scope of any one or more of the appended claims.

What I claim as new and desire to secure by Letters Patent, is:

1. A mechanism comprising, in combination, a frame, a driven member and its shaft mounted in said frame, a bearing assembly including raceways for one end of the shaft, a sleeve slidable axially on the shaft and extending through said bearing to support the same, a turbine wheel carried by said sleeve for rotating the same, said sleeve having means for holding the bearing on one side thereof, means screw threaded on the sleeve for holding the bearing on the other side thereof, and screw means for forcing the bearing assembly from said sleeve.

2. A mechanism comprising, in combination, a frame, a driven member and its shaft mounted in said frame, bearings including raceways for one end of the shaft, a sleeve slidable axially on the shaft and extending through said bearings to support the same, a turbine wheel rigidly secured to the sleeve, said sleeve having means for holding the bearings on one side thereof, means screw threaded on the sleeve for holding the bearings on the other side thereof, frame members carried by the said frame and enclosing said bearings, and screw means for forcing the bearing assembly from said sleeve and from said frame members.

3. In a mechanism, in combination, a frame, a shaft mounted in said frame having an extension sleeve upon which a turbine wheel is mounted, a valve for controlling the flow of steam to the turbine wheel, centrifugal governor means mounted upon said sleeve and operatively connected through a lever to said valve, said governor means being supported from said shaft and connected to said lever respectively through bearings providing for limited universal movement.

4. In a mechanism, in combination, a frame, a shaft mounted in said frame having an extension sleeve upon which a turbine wheel is mounted, a valve for controlling the flow of steam to the turbine wheel, centrifugal governor means mounted upon said sleeve and operatively connected through a lever to said valve, said governor means comprising a thrust stem embraced by a compression spring within said sleeve, pivotally mounted governor weights mounted exteriorly of said sleeve and having head portions extending through apertures in the sleeve and into contact with said thrust stem, said stem having spherically formed bearing members respectively engaging said sleeve and said lever permitting a limited universal movement of said stem.

5. In a mechanism, in combination, a frame, a shaft mounted in said frame having an extension sleeve upon which a turbine wheel is mounted, a valve for controlling the flow of steam to the turbine wheel, centrifugal governor means mounted upon said sleeve and operatively connected through a lever to said valve, said governor means comprising a thrust stem embraced by a compression spring within said sleeve, pivotally mounted governor weights mounted exteriorly of said sleeve and having head portions extending through apertures in the sleeve and into contact with said thrust stem, said stem having a spherical bearing portion contacting with the interior of said sleeve, and means connecting said stem to said lever.

6. In a mechanism, in combination, a shaft, a sleeve extending over one end of said shaft and rotatable therewith, a turbine wheel secured on said sleeve to rotate said shaft, said sleeve extending beyond the end of said shaft, a fulcrum member attached to said turbine wheel, a thrust stem mounted for limited universal movement within said sleeve, centrifugal members fulcrumed on said fulcrumed member and adapted to engage the inner end of said thrust stem to cause endwise movement thereof, a spring in said sleeve mounted to oppose the thrust of said centrifugal members, and adjustable means engaging the outer end of said sleeve and said spring adapted to adjust the tension of said spring.

7. In a mechanism, in combination, a shaft, a sleeve extending over one end of said shaft and rotatable therewith, a turbine wheel secured on said sleeve to rotate said shaft, said sleeve extending beyond the end of said shaft, a fulcrum member attached to said turbine wheel, a thrust stem mounted for limited universal movement within said sleeve, centrifugal members fulcrumed on said fulcrum member and adapted to engage the inner end of said thrust stem to cause endwise movement thereof, a spring in said sleeve mounted to oppose the thrust of said centrifugal members, adjustable means engaging the outer end of said sleeve and said spring adapted to adjust the tension of said spring, and means tending normally to hold said adjustable means in adjusted position.

8. In a mechanism, in combination, a frame, a shaft mounted in said frame having an extension sleeve upon which a turbine wheel is mounted, a valve for controlling the flow of steam to the turbine wheel, centrifugal governor means mounted upon said sleeve and operatively connected through a lever to said valve, said governor means comprising a thrust stem mounted to reciprocate within said sleeve and having at its inner end a rounded head supported within said sleeve, a pair of hemispherical thrust-cups having bearing portions mounted on said thrust stem adjacent the outer end thereof, a sleeve on said lever loosely surrounding said bearing portions of said thrust-cups, and friction reducing means interposed between said thrust-cups and the surface of said lever enveloped thereby.

9. In a mechanism, in combination, a frame, a shaft mounted in said frame having an extension sleeve upon which a turbine wheel is mounted, a valve for controlling the flow of steam to the turbine wheel, centrifugal governor means mounted upon said sleeve and operatively connected through a lever to said valve, said governor means comprising a thrust member having a spherical support at its inner end within said sleeve and a spherical friction reducing bearing at its outer end engaging said lever.

10. In a mechanism including a shaft, a turbine wheel connected to drive said shaft at one end thereof, a housing for the mechanism, a housing for the turbine wheel removably secured to the first named housing, a centrifugal governor connected to the end of the shaft adjacent the turbine wheel, a piston valve carried by the turbine wheel housing for controlling the admission of steam to the turbine wheel, means whereby said governor controls said valve, and means for conducting steam leakage from said valve to the interior of said turbine housing.

11. In apparatus of the character described, in combination, a frame, a shaft mounted in said frame, a turbine wheel connected adjacent an end of said shaft to drive said shaft, a housing for the turbine wheel removably secured to said frame, a piston valve carried by the turbine wheel housing for controlling the admission of steam to the turbine wheel, means for controlling the operation of said valve, a steam strainer carried by said turbine wheel housing to strain the steam before it reaches said valve, and a screw-threaded member connected to said strainer whereby unscrewing said member will move said strainer in a direction to remove the same from its housing.

12. In apparatus of the character described, in combination, a frame, a shaft mounted in said frame, a turbine wheel connected adjacent an end of said shaft to drive said shaft, means for housing the turbine wheel, a valve in said housing for controlling the admission of steam to the turbine wheel, a centrifugal governor connected to the shaft for controlling said valve, a steam strainer located in the housing to strain the steam before it reaches said valve, and a member screw-threaded in the housing and rotatably secured to said strainer and adapted to remove the strainer from the housing when said member is unscrewed therefrom.

In testimony whereof I have signed my name to this specification.

ELI J. BLAKE.